(12) United States Patent
Salili et al.

(10) Patent No.: US 11,709,351 B2
(45) Date of Patent: Jul. 25, 2023

(54) LIGHT-SHEET FLUORESCENCE IMAGING WITH ELLIPTICAL LIGHT SHAPING DIFFUSER

(71) Applicant: THE TRUSTEES OF THE UNIVERSITY OF PENNSYLVANIA, Philadelphia, PA (US)

(72) Inventors: Seyyed Salili, Drexel Hill, PA (US); Douglas Durian, Swarthmore, PA (US); Matthew Harrington, Philadelphia, PA (US)

(73) Assignee: THE TRUSTEES OF THE UNIVERSITY OF PENNSYLVANIA, Philadelphia, PA (US)

(*) Notice: Subject to any disclaimer, the term of this patent is extended or adjusted under 35 U.S.C. 154(b) by 244 days.

(21) Appl. No.: 16/763,158

(22) PCT Filed: Nov. 6, 2018

(86) PCT No.: PCT/US2018/059335
§ 371 (c)(1),
(2) Date: May 11, 2020

(87) PCT Pub. No.: WO2019/094351
PCT Pub. Date: May 6, 2019

(65) Prior Publication Data
US 2020/0386977 A1 Dec. 10, 2020

Related U.S. Application Data

(60) Provisional application No. 62/585,142, filed on Nov. 13, 2017.

(51) Int. Cl.
*G02B 21/00* (2006.01)
*G02B 21/06* (2006.01)
*G02B 21/36* (2006.01)

(52) U.S. Cl.
CPC ......... *G02B 21/06* (2013.01); *G02B 21/0076* (2013.01); *G02B 21/36* (2013.01)

(58) Field of Classification Search
CPC .... G02B 21/06; G02B 21/0076; G02B 21/36; G02B 21/0032; G02B 21/16;
(Continued)

(56) References Cited

U.S. PATENT DOCUMENTS 5,534,386 A * 7/1996 Petersen ............... G02B 6/0008
430/1
5,756,981 A * 5/1998 Roustaei ............ G06K 7/10732
235/462.07
(Continued)

OTHER PUBLICATIONS

International Search Report dated Jan. 22, 2019 in International Application No. PCT/US2018/059335.

*Primary Examiner* — Mustak Choudhury
(74) *Attorney, Agent, or Firm* — Baker Botts L.L.P.

(57) ABSTRACT

Systems and methods for passive multi-directional illumination in light-sheet fluorescence imaging and microscopy are disclosed herein. An elliptical light shaping diffuser is placed in the illumination path between the source of a light-sheet and the illuminated sample. The light-sheet is diffused anisotropically along two directions perpendicular to its propagation direction, eliminating stripe artifacts in obtained images. The method includes converting a light-sheet into an elliptically diffuse light-sheet by passing it through an elliptical light shaping diffuser, illuminating a sample with the elliptically diffuse light-sheet. The system includes a light-sheet source, an elliptical light shaping diffuser adapted to convert the light-sheet into an elliptically diffuse light-sheet to illuminate the sample, typical microscopy optics and lenses, and image capturing elements.

17 Claims, 4 Drawing Sheets

(58) Field of Classification Search
CPC ... G02B 21/367; G03F 7/705; G06K 7/10811;
G06K 7/10841; G06K 7/10881
See application file for complete search history.

(56) References Cited

U.S. PATENT DOCUMENTS

| | | |
|---|---|---|
| 7,797,179 B2 | 9/2010 | Chakraborty et al. |
| 8,465,193 B1* | 6/2013 | Arik ................. G02B 5/021 362/618 |
| 2005/0063063 A1* | 3/2005 | Ashdown ............. F21V 5/002 359/599 |
| 2013/0335797 A1 | 12/2013 | Cooper |
| 2015/0168732 A1 | 6/2015 | Singer et al. |
| 2016/0291304 A1 | 10/2016 | Singer et al. |
| 2016/0306154 A1* | 10/2016 | Iguchi .................. G02B 21/16 |

* cited by examiner

LIGHT-SHEET FLUORESCENCE IMAGING WITH ELLIPTICAL LIGHT SHAPING DIFFUSER

CROSS REFERENCE TO RELATED APPLICATION

This application is related to, and is a U.S. National Stage Patent Application under 35 U.S.C. § 371 of International Application No. PCT/US2018/059335, filed on Nov. 6, 2018, which claims priority from, U.S. Provisional Patent Application No. 62/585,142, entitled "Light-Sheet Fluorescence Imaging with Elliptical Light Shaping Diffuser", which was filed on Nov. 13, 2017, the entire contents of each of which are incorporated by reference herein in their entirety.

STATEMENT REGARDING FEDERALLY SPONSORED RESEARCH

This invention was made with government support under grant DMR-1305199 awarded by the National Science Foundation. The government has certain rights in the invention.

FIELD OF THE INVENTION

The disclosed subject matter relates to a new method and system for creating multi-directional illumination and improve quality of fluorescence light-sheet imaging and microscopy.

BACKGROUND

Light-sheet fluorescence imaging can be a robust technique having use in a variety of systems ranging from biological to colloidal and/or granular. Light-sheet fluorescence imaging involves illuminating a sample by a laser sheet, resulting in a two dimensional cross-sectional image, which can be combined into a stack of scanned images to obtain a three-dimensional representation of the sample being imaged. Light-sheet fluorescence imaging can provide high resolution and image acquisition speed, and therefore allow for particle tracking across images. However, images from certain applications may not be pristine and/or contain stripes not present in the sample. The stripes can arise from either light-absorbing or light-scattering structures along the illumination path casting shadows. The stripes can lead to misinterpretation of the image data; for example, stripes can cause standard particle-tracking algorithms to erroneously report a series of adjacent particles and interpret movement therefrom.

Certain techniques are known for reducing the prominence of the stripes. For example, in the biological field, certain image processing algorithms, Bessel beam illumination and dynamic multidirectional light-sheet illumination techniques such as, an airy beam illumination and a scanner beam illumination can be used. In the colloidal and granular material field, better refractive index matching, and image processing algorithms have been used. However, such techniques can be labor intensive, expensive, and ineffective at reducing the prominence of stripes in the images.

Accordingly, there exists a need for another facile technique for reducing stripe artifacts in light-sheet fluorescence imaging.

SUMMARY

Systems and methods for reducing stripe artifacts in light-sheet fluorescence imaging are disclosed herein.

In some embodiments, the disclosed subject matter provides methods for light-sheet fluorescence imaging of a specimen. An example method includes providing a sample, creating an elliptically diffuse light-sheet, illuminating the sample with the elliptically diffuse light-sheet, imaging the illuminated specimen, and capturing at least one image of the sample.

In some embodiments, the at least one image does not exhibit shadows or stripe artifacts. In some embodiments, the elliptical light shaping diffuser produces a passive multi-directional illumination which circumvents scattering and absorbing objects.

In other embodiments, creating an elliptically diffuse light-sheet comprises passing a parallel light-sheet through an elliptical light shaping diffuser. In some embodiments, the elliptical light shaping diffuser is one of an elliptical holographic diffuser and a line diffuser.

In other embodiments, the elliptical light shaping diffuser is adapted transform an input light-sheet into an output light-sheet that spreads anisotropically along orthogonal diffusing angles. In some embodiments, the sample has features to be imaged, and wherein the features to be imaged have a feature size larger than a width of the elliptically diffuse light-sheet upon illumination of the sample, wherein the width is measured in a direction perpendicular to a plane defined by the parallel light sheet. In some embodiments, the elliptically diffuse light-sheet spreads at a larger diffusing angle in a plane parallel to the parallel light-sheet than in a plane perpendicular to the parallel light-sheet.

Systems for light-sheet fluorescence imaging of a sample using a light-sheet are also disclosed herein. In an example embodiment, a system includes a light source adapted to create a light-sheet, an elliptical light shaping diffuser adapted to convert the light-sheet into an elliptically diffuse light-sheet and illuminate the sample, typical microscopy optics and lenses, and image capturing elements.

In some embodiments, the elliptical light shaping diffuser is at least one of an elliptical holographic diffuser and a line diffuser. In other embodiments, the at least one microscopy optic is part of a microscope. In some embodiments, images captured by the image capturing element do not exhibit shadows or stripe artifacts.

In some embodiments, the light source provides a substantially monochromatic beam. In some embodiments, the substantially monochromatic beam is passed through a laser line generator and is shaped into a line. In other embodiments, the wavelength of the substantially monochromatic beam is within absorption range of the fluorescent sample.

In other embodiments, the elliptical light shaping diffuser is located between the light source and the fluorescent sample. In some embodiments, the elliptical light shaping diffuser is located closer to the fluorescent sample than to the light source. In still other embodiments, the parallel light-sheet is passed through the elliptical light shaping diffuser at a location that can vary based on properties of the at least one optic.

The accompanying drawings, which are incorporated and constitute part of this disclosure, illustrate and explain the principles of the disclosed subject matter.

Figure 1:
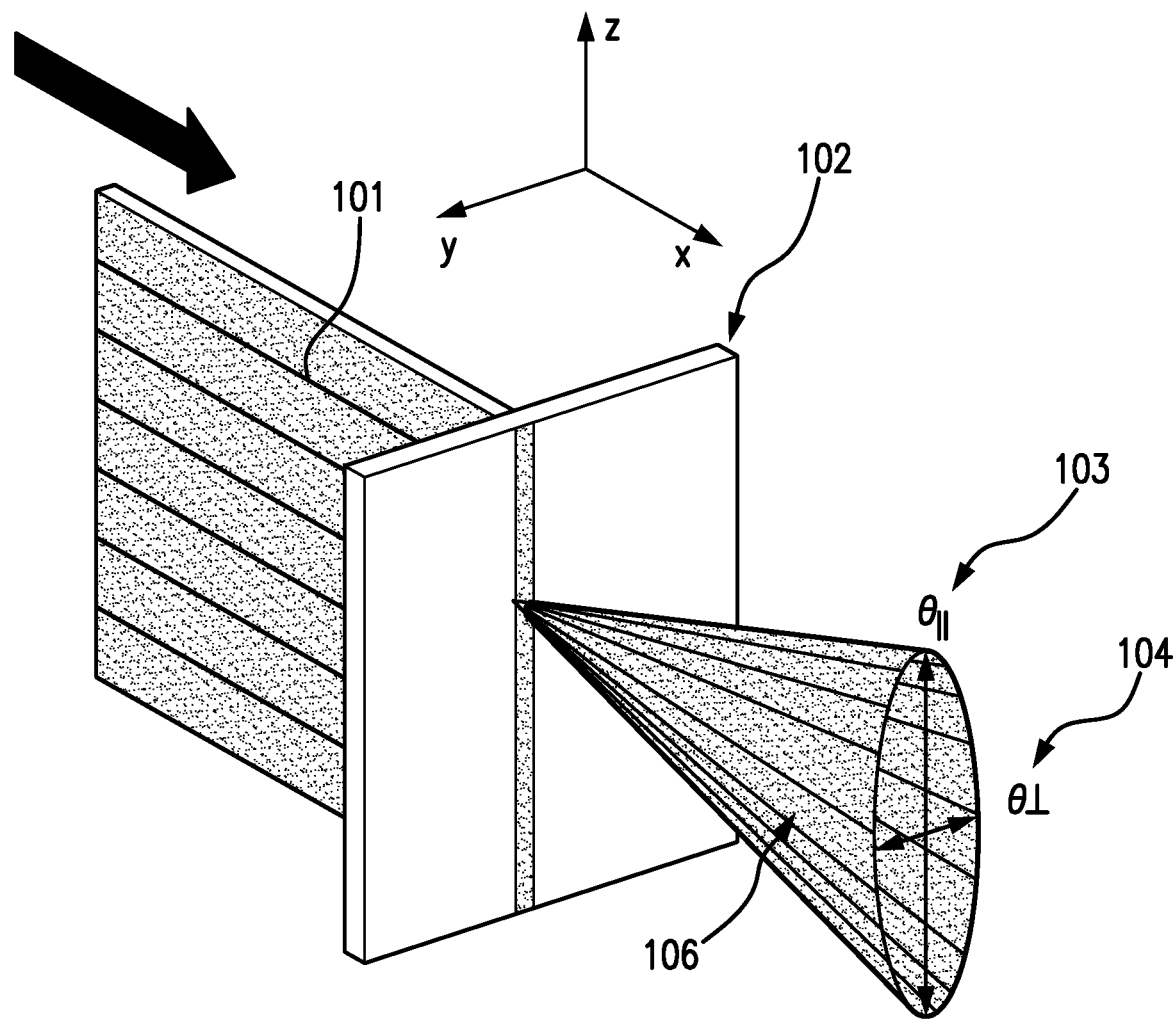
FIG. 1 is a diagram of a method in accordance with some embodiments of the disclosed subject matter, showing a light-sheet passing through an elliptical light shaping diffuser, and being converted into an elliptically diffuse light sheet.

Throughout the drawings, the same reference numerals and characters, unless otherwise stated, are used to denote like features, elements, components or portions of the illustrated embodiments. Moreover, while the disclosed subject matter will now be described in detail with reference to the Figs., it is done so in connection with the illustrative embodiments.

DETAILED DESCRIPTION

Techniques for reducing shadow stripe artifacts in light-sheet fluorescence imaging are presented. Light-sheet fluorescence imaging requires samples to be illuminated by thin sheet of light. Light-sheets are thin sheets of light that contain rays that locally, relative to the sheet thickness, travel in the same direction, while also continually spreading out at longer propagation distances. Light-sheets therefore are generally comprised of nearly parallel light rays.

Light-sheets can be used to illuminate objects in certain microscopy techniques. Objects that are illuminated by light-sheets, such as absorbing and scattering objects, are illuminated primarily in one direction, the direction of the substantially parallel light rays in the light sheet. Illumination of absorbing or scattering objects or features from primarily one direction can cause the formation of shadows. For example, illuminating and imaging a sample having surface features with a parallel-light light-sheet can yield images that show shadows of the surface features, especially stripe artifacts, that stretch along the propagation direction.

As disclosed herein, passing a parallel-light light-sheet through an elliptical light shaping diffuser can yield outgoing light that exits the diffuser that has properties different than ingoing light that enters the diffuser. For example, incoming light rays can be substantially parallel, and can be scattered upon passing through an elliptical light shaping diffuser such that the light rays of the outgoing light are instead disposed at diffuse angles.

Referring to the figures for purpose of illustration and not limitation, and in particular with reference to FIG. 1, in some embodiments the disclosed subject matter can include an elliptical light shaping diffuser 102 placed into the incident light-sheet 101, to yield a transmitted elliptically diffuse light sheet 106. The elliptical light shaping diffuser 102 can be configured such that the parallel-light light-sheet 101 is transformed to a transmitted elliptically diffuse light-sheet 106 upon passing through the elliptical light shaping diffuser 102. In particular, the light rays within the transmitted elliptically diffuse light-sheet 106 can travel at diffuse angles within a resulting light-sheet, with the resulting light-sheet 106 remaining thin. For example, the angle 104 ($\theta_\perp$) at which the resulting light rays spread in a direction perpendicular to a plane defined by the parallel-light light-sheet 101 can be less than or equal to 0.1 degrees. By contrast, the transmitted elliptically diffuse light-sheet 106 can be highly diffuse in an orthogonal direction. For example, the angle 103 ($\theta_\parallel$) at which the resulting light rays spread in a direction parallel to a plane defined by the parallel-light light-sheet 101 can be about 45 degrees. Thus, the transmitted elliptically diffuse light-sheet 106 is highly anisotropic in its propagation. The transmitted elliptically diffuse light-sheet 106, when used to illuminate and image microscopy samples with surface features for example, reduces the presence of shadows/stripe artifacts in the obtained images. By contrast, an ordinary circular diffuser causes transmitted light to emerge isotropically at all angles.

Figure 2:
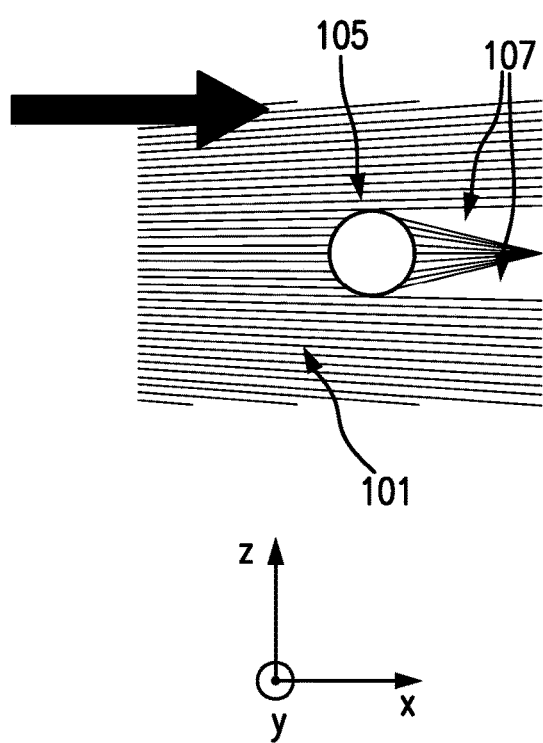
FIG. 2 is a ray-tracing diagram illustrating the prior art light-sheet imaging techniques and the resulting stripe artifacts.

As shown in FIG. 2 for purpose of illustration and not limitation, illumination of an object 105 by a parallel-light light-sheet 101 can result in the presence of image artifacts 107. For example, the object 105 can be a light absorbing or scattering object, and can block reflect light rays. The object 105 can be a surface or other feature of a sample to be imaged. Additionally or alternatively the object 105 can be the entire sample to be imaged. Interaction of parallel-light rays with the object can cause interference, resulting in areas with a lower relative presence of light rays. The areas with lower relative presence of light rays can appear as image artifacts 107 in a captured image for example.

Figure 3:
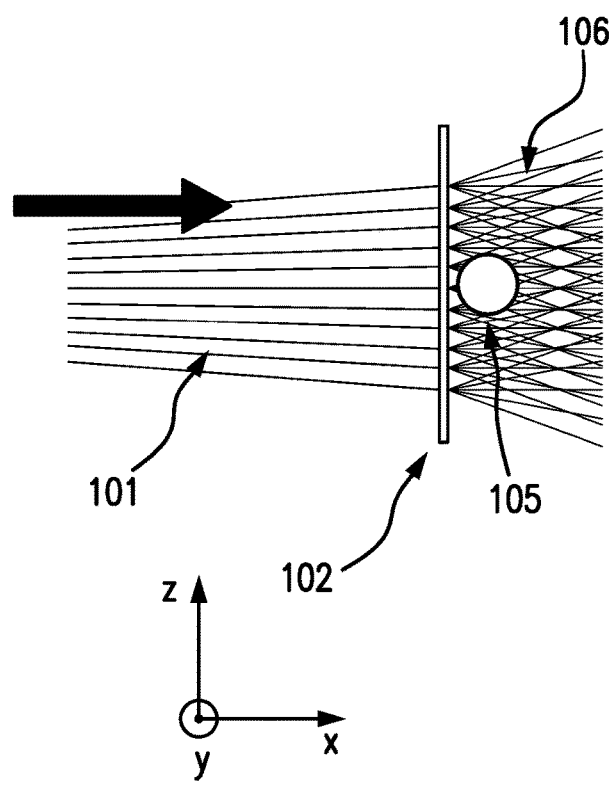
FIG. 3 is a ray-tracing diagram illustrating the disclosed light-sheet imaging technique and the lack of stripe artifacts.

In accordance with the disclosed subject matter, and as shown in FIG. 3 for purpose of illustration and not limitation, passing a parallel-light light-sheet 101 through an elliptical light shaping diffuser 102 can yield a transmitted elliptically diffuse light-sheet 106 that interacts differently with light absorbing or scattering objects 105 as compared to parallel-light light-sheets, thus reducing image artifacts 107. As seen in FIG. 3 for example, and for purpose of illustration and not limitation, the light rays of the transmitted elliptically diffuse light-sheet 106 can travel in a direction parallel to the plane defined by the parallel-light light-sheet at large angles relative to each other. This allows the light rays to travel behind an example object 105, and illuminate it from multiple directions, reducing the degree to which any location(s) may have reduced illumination. As such, the multi-directional illumination serves to reduce image artifacts 107.

As disclosed, the angle 104 ($\theta_\perp$) at which the resulting light rays spread in a direction perpendicular to a plane defined by the parallel-light light-sheet 101 can be less than or equal to 0.1 degrees, whereas the angle 103 ($\theta_\parallel$) at which the resulting light rays spread in a direction parallel to a plane defined by the parallel-light light-sheet 101 can be about 45 degrees. However, stripe artifact reduction and elimination can be increased by using larger parallel diffusing angle 103 ($\theta_\parallel$), especially in combination with a smaller perpendicular diffusing angle 104 ($\theta_\perp$). For example, the degree of anisotropy, the degree to which the parallel diffusing angle 103 ($\theta_\parallel$) and the perpendicular diffusing angle 104 ($\theta_\perp$) differ, can affect the amount that the light rays of the transmitted elliptically diffuse light-sheet 106 can travel to locations behind and around objects. For example, in specific embodiments, the scale of perpendicular transmitted diffusing angle 104 ($\theta_\perp$) may be smaller or larger than the divergence of the thickness of the parallel-light light-sheet 101, such that the use of the elliptical light shaping diffuser does not increase the divergence of the light-sheet.

In some embodiments of the disclosed subject matter, parallel diffusing angles 103 of 30° to 60° may be used. In other embodiments, the perpendicular diffusing angle 104 is small enough that the resulting light does not significantly thicken as it traverses the object 105. In one embodiment, the perpendicular diffusing angle 104 needs only to be small enough that the transmitted elliptically diffuse light-sheet 106 does not become thicker than an example feature size before illuminating the object 105. In an example embodiment, a perpendicular diffusing angle 104 less than or equal to 1° performs well for 4.8-mm features.

Figure 4:
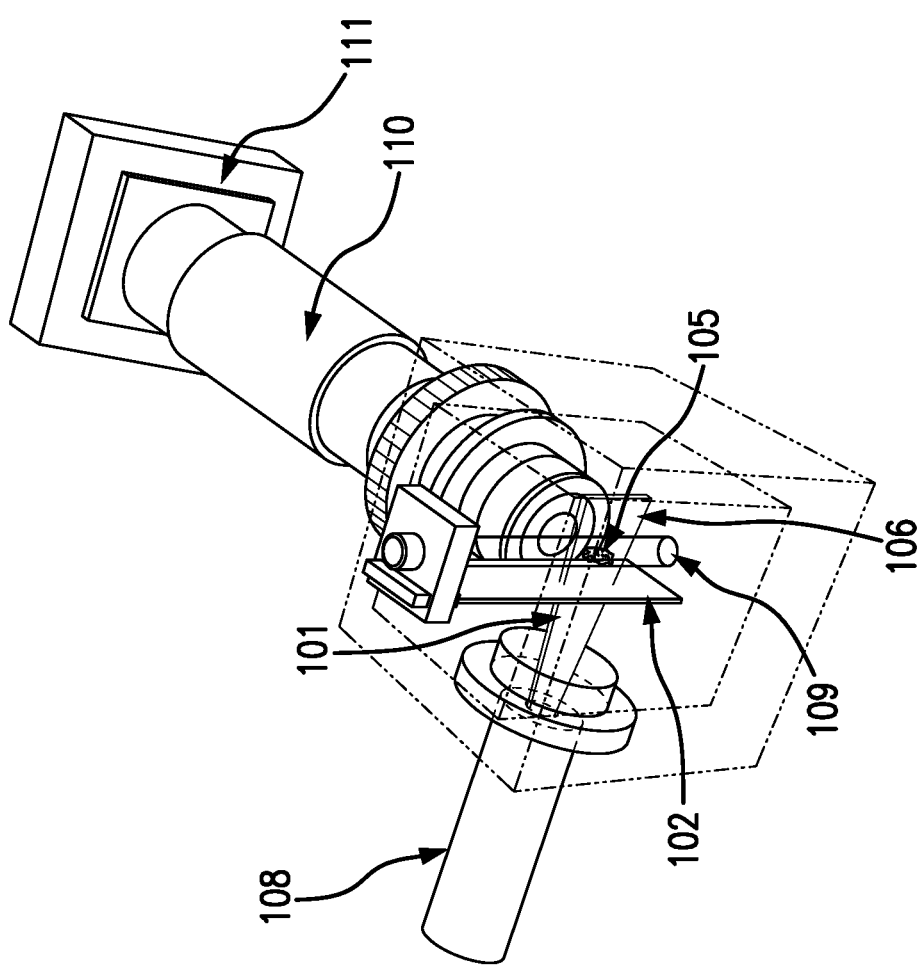
FIG. 4 is a diagram of the disclosed system utilizing the disclosed method in a microscopy context, including a specimen and optical components.

In some embodiments of the disclosed subject matter, images of samples illuminated with transmitted elliptically diffuse light-sheet 106 can be captured. For example, images can be captured using optical components and an image recording device. In an example embodiment, and with reference to FIG. 4 for purpose of illustration and not limitation, a parallel-light light-sheet 101 is generated by a laser diode 108, passes through an elliptical light shaping diffuser 102, and illuminates an object 105 with transmitted elliptically diffuse light-sheet 106. The object 105 can be placed in a sample holder 109, which lies in front of microscopy optics for example. Sample holder 109 Microscopy optics can include lenses, mirrors, shades, guards, beam condensers, and/or filters, as will be understood by those skilled in the art. Sample holders can include any structure sufficient to hold a sample or an object to be imaged, and can depend on the size and properties of the sample or object. Additionally or alternatively, the sample holder 109 can lie in front of an objective lens 110 that is attached to a camera 111. The camera 111 can be an optical camera, an infrared camera, an ultraviolet camera, or similar, and can depend on the wavelength of light used for illumination or the wavelength of fluorescence of a sample, for example. Additionally or alternatively, camera 111 can be any object capable of obtaining illumination data and recording the result, such as a computer server connected to a sensor.

Figure 5:
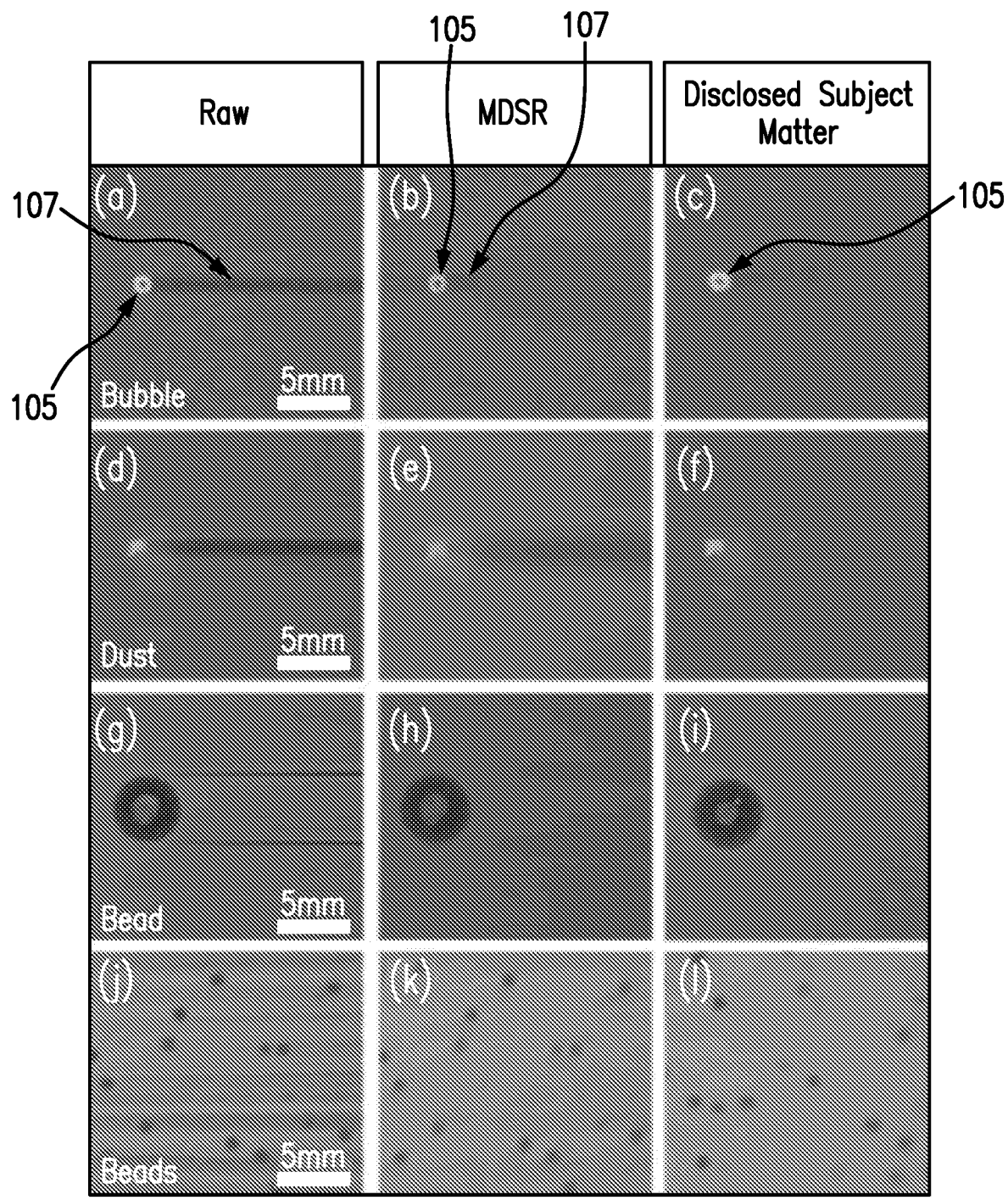
FIG. 5 is a series of images captured in accordance with different imaging techniques, illustrating the stripe artifacts associated with the prior art light-sheet imaging techniques and benefits of the disclosed subject matter.

As shown in FIG. 5 for purpose of illustration and not limitation, the disclosed subject matter can reduce and/or eliminate the presence of image artifacts 107 in images obtained. Specifically, as compared to images of objects illuminated with parallel-light light-sheets (raw images), and as compared to images of objects processed through the Multidirectional Stripe Removal method (MDSR), images of objects obtained in accordance with the disclosed subject matter have significantly reduced artifacts. Benefits of the disclosed subject matter will be appreciated by those skilled in the art, including through the practice of the disclosed subject matter. Such benefits include at least the ability to obtain more clear images of known objects, which allows for improved visual analysis of images. Improved visual analysis can be particularly beneficial, for example, when the images are processed automatically by computers or otherwise. Additional benefits include but are not limited to increased ability to identify small objects or to distinguish objects that may be located close together.

The foregoing merely illustrates the principles of the disclosed subject matter. Various modifications and alterations to the described embodiments will be apparent to those skilled in the art in view of the teachings herein. It will thus be appreciated that those skilled in the art will be able to devise numerous techniques which, although not explicitly described herein, embody the principles of the disclosed subject matter and are thus within its spirit and scope.

The invention claimed is:

1. A method of light-sheet fluorescence imaging comprising:
    providing a sample;
    providing a parallel-light light sheet;
    creating an elliptically diffuse light-sheet by passing the parallel-light light sheet through an elliptical light-shaping diffuser to produce a passive multi-directional illumination which circumvents scattering and absorbing objects and results in decreased formation of shadows and stripe artifacts in the at least one image of the sample compared to an image of the sample illuminated with single-directional illumination;
    wherein the elliptically diffuse light sheet is configured to transmit a first plurality of light rays in a direction parallel to the parallel-light light sheet and a second plurality of light rays in a direction perpendicular to the parallel-light light sheet;
    illuminating the sample with the elliptically diffuse light-sheet;
    capturing at least one image of the sample.

2. The method of claim 1, wherein the at least one image does not exhibit shadows or stripe artifacts.

3. The method of claim 1, wherein the elliptical light shaping diffuser is one of an elliptical holographic diffuser and a line diffuser.

4. The method of claim 1, wherein the elliptical light shaping diffuser is adapted to transform an input light-sheet into an output light-sheet that spreads anisotropically along orthogonal diffusing angles.

5. The method of claim 4, wherein the sample has one or more surface features to be imaged, and wherein the one or more surface features to be imaged have a size larger than a width of the elliptically diffuse light-sheet upon illumination of the sample, wherein the width is measured in a direction perpendicular to a plane defined by the parallel light sheet.

6. The method of claim 4, wherein the elliptically diffuse light-sheet spreads at a larger diffusing angle in a plane parallel to the parallel light-sheet than in a plane perpendicular to the parallel light-sheet.

7. A system for light-sheet fluorescence imaging of a fluorescent sample comprising:
    a light source adapted to create a parallel-light light-sheet;
    an elliptical light shaping diffuser adapted to convert the light-sheet into an elliptically diffuse light-sheet by passing the parallel-light light-sheet through the elliptical light shaping diffuser, the elliptically diffuse light-sheet comprising a first plurality of light rays oriented parallel to the parallel-light light-sheet and a second plurality of light rays oriented perpendicular to the parallel-light sheet and illuminate the specimen;
    at least one microscopy optic;
    an image capturing element;
    wherein the elliptical light shaping diffuser is configured to produce a passive multi-directional illumination which circumvents scattering and absorbing objects and wherein the multi-directional illumination results in decreased formation of shadows and stripe artifacts in at least one image of the sample compared to an image of the sample illuminated with single-directional illumination.

8. The system of claim 7, wherein the elliptical light shaping diffuser is at least one of an elliptical holographic diffuser and a line diffuser.

9. The system of claim 7, wherein the at least one microscopy optic is part of a microscope.

10. The system of claim 7, wherein images captured by the image capturing element do not exhibit shadows or stripe artifacts.

11. The system of claim 7, wherein the light source provides a substantially monochromatic beam.

12. The system of claim 11, wherein the substantially monochromatic beam is passed through a laser line generator and is shaped into a line.

13. The system of claim 11, wherein the wavelength of the substantially monochromatic beam is within absorption range of the fluorescent sample.

14. The system of claim 7, wherein the elliptical light shaping diffuser is located between the light source and the fluorescent sample.

15. The system of claim 14, wherein the elliptical light shaping diffuser is located closer to the fluorescent sample than to the light source.

16. The system of claim 15, wherein the parallel light-sheet is passed through the elliptical light shaping diffuser at a location that can vary based on properties of the at least one microscopy optic.

17. A system for light-sheet fluorescence imaging of a fluorescent sample comprising:
  a light source adapted to create a parallel-light light-sheet;
  an elliptical light shaping diffuser adapted to convert the light-sheet into an elliptically diffuse light-sheet, comprising a first plurality of light rays oriented parallel to the parallel-light light-sheet and a second plurality of light rays oriented perpendicular to the parallel-light sheet and illuminate the specimen;
  at least one microscopy optic;
  an image capturing element;
  wherein a diffusion angle of the second plurality of light rays oriented perpendicular to the parallel-light sheet is less than a divergence of a thickness of the parallel-light light sheet, configured such that the elliptical light shaping diffuser does not increase the divergence of the parallel-light sheet.

* * * * *